United States Patent [19]

Shadwell et al.

[11] Patent Number: 4,940,168
[45] Date of Patent: Jul. 10, 1990

[54] CONNECTOR

[75] Inventors: David W. Shadwell, Macclesfield; Martin Joseph, Altrincham, both of England

[73] Assignee: Imperial Chemical Industries PLC, London, England

[21] Appl. No.: 332,397

[22] Filed: Mar. 28, 1989

Related U.S. Application Data

[63] Continuation of Ser. No. 64,567, Jun. 22, 1987, abandoned.

[30] Foreign Application Priority Data

Jun. 24, 1986 [GB] United Kingdom ............... 8615410

[51] Int. Cl.⁵ .............................................. B67B 5/00
[52] U.S. Cl. .................................. 222/153; 222/567; 403/351; 285/307
[58] Field of Search ...................... 220/274, 1 S, 85 F, 220/85 SP, DIG. 20; 215/14; 141/383–386; 285/921, 307, 319–320; 222/570, 567, 400.7, 153; 403/351, 326

[56] References Cited

U.S. PATENT DOCUMENTS

| | | | |
|---|---|---|---|
| 2,084,344 | 6/1937 | Jesnig | 222/147 |
| 2,099,335 | 11/1937 | Hansen | 285/320 X |
| 2,698,113 | 12/1954 | Linton | 222/567 X |
| 3,439,939 | 4/1969 | Cornelius | 285/307 X |
| 3,773,360 | 11/1973 | Timbers | 285/307 |
| 4,108,475 | 8/1978 | Fleischer | 285/320 X |
| 4,543,980 | 10/1985 | van der Sanden | 222/147 X |
| 4,651,901 | 3/1987 | Ozdemir | 222/567 X |
| 4,665,940 | 5/1987 | Jacobson | 222/400.7 |

FOREIGN PATENT DOCUMENTS

| | | |
|---|---|---|
| 0080846 | 6/1983 | European Pat. Off. . |
| 0133348 | 7/1984 | European Pat. Off. . |
| 360369 | 10/1922 | Fed. Rep. of Germany ...... 222/567 |
| 582308 | 7/1933 | Fed. Rep. of Germany ...... 222/567 |
| 1213397 | 3/1960 | France . |
| 00828 | 5/1980 | PCT Int'l Appl. . |

Primary Examiner—H. Grant Skaggs
Attorney, Agent, or Firm—Cushman, Darby & Cushman

[57] ABSTRACT

A connection device for two components, for example a container and a dispenser, provided with a member moveable between two positions. In the first position the member permits engagement of the two components. The member moves between the first and second position upon either connection or disconnection of the components and can not be readily moved back to the first position with the member. In the second position the components can not be re-engaged.

12 Claims, 3 Drawing Sheets

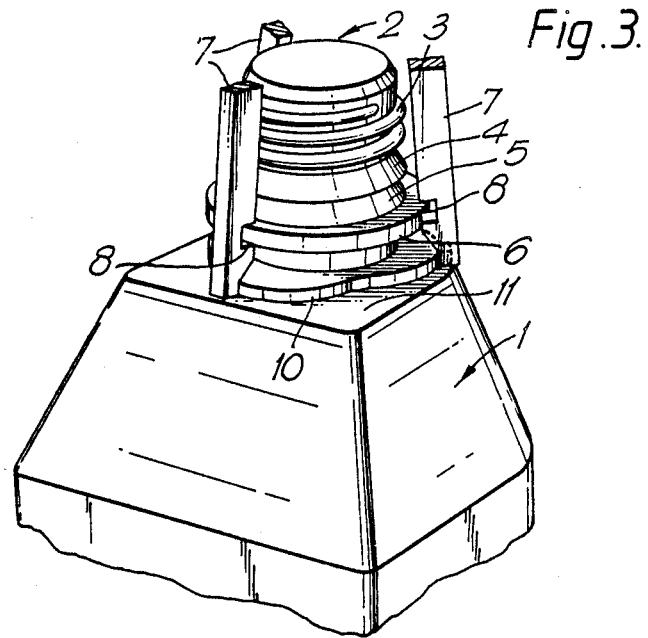
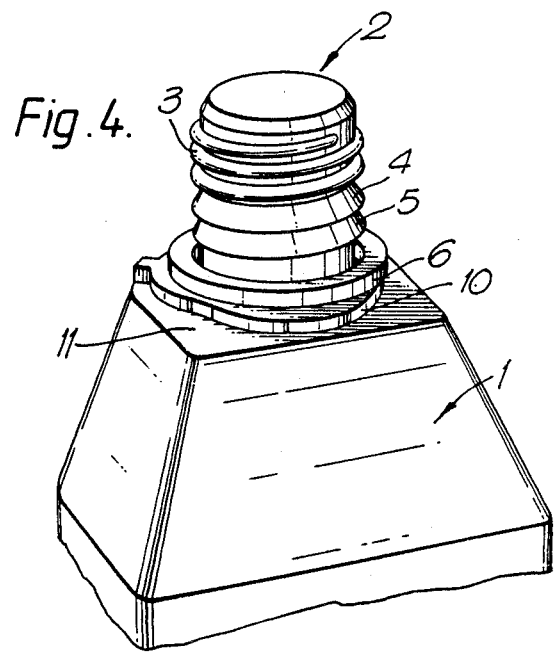

CONNECTOR

This is a continuation of application Ser. No. 07/064,567, filed June 22, 1987, which was abandoned upon the filing hereof.

This invention relates to connection devices, more particularly devices for providing a connection between a container and a dispenser the contents of the container.

It is known, for example from British Patents Nos. 1339341, 1443697 and 1468654 to provide a connection between a bottle and a dispenser such that part of the bottle is cut off by a blade upon removal, thus preventing re-use of the bottle.

The above methods have disadvantages in that they involve parts (eg the blade) subject to wear and tear and might be expected to be unreliable in operation.

We have now discovered an improved method whereby a non-reusable connection between two such components may be made.

In the following specification the terms inlet and outlet refer to an inlet for fluid and an outlet for fluid respectively. Fluid means liquid, gas or powder but most particularly means liquid. It will be understood that the terms inlet and outlet may be interchangeable in that upon reversal of fluid flow an inlet may become an outlet and vice versa.

Accordingly in its broadest aspect the invention provides a component having an inlet portion provided with a member moveable between at least two positions being (i) a first position permitting engagement with a support for the component in connection with a second component having an outlet portion and (ii) a second position not permitting re-engagement, the arrangement being such that the member cannot readily be moved from the second position to the first position and that the member moves between the first and second position upon either connection or disconnection of the component and the second component.

In a second aspect the invention provides a component having an outlet portion provided with a support for a component having an inlet portion as hereinbefore described and not to permit separation of the components when the member is in the first position and which does not permit reconnection of the components when the member is in the second position.

In a third aspect the invention provides an assembly comprising a component having an inlet portion of the type described and a component having an outlet portion of the type described for use in transferring fluid from the inlet portion to the outlet portion.

The invention is particularly useful for providing an improved connection between a container and a dispenser such that upon removal of the container from connection with the dispenser the container cannot be reconnected thereto.

Accordingly the invention provides, in a particular aspect, a container provided with a member moveable between at least two positions being a first position permitting engagement with means for supporting the container in connection with apparatus for dispensing the contents of the container and a second position not permitting re-engagement, the arrangement being such that the member cannot readily be moved from the second position to the first position and that the member moves between the first and second position upon either connection or disconnection of the container and the apparatus.

In a second particular aspect the invention provides a dispenser provided with means adapted to support a container as hereinbefore described and not to permit removal of the container therefrom when the member is in the first position and which does not permit reconnection of the container and dispenser when the member is in the second position.

In a third particular aspect the invention provides an assembly comprising a container and a dispenser of the types hereinbefore described for use in dispensing the contents of the container.

In the above particular aspects of the invention the container may be provided in the form of a bottle which may be of any shape, but which will conveniently be provided with a neck which will conveniently be at least in part of substantially circular cross-section. In that case the member referred to is conveniently provided in the form of a collar eg. a ring slideably moveable on the neck, the first and second positions of the ring on the neck being defined by formations on the neck. The member could also be non-circular and adapted to be slideably moveable on a neck of corresponding non-circular cross-section.

The container (including the neck) may advantageously be manufactured from plastics material and the said formations on the neck may take the form of mouldings thereon.

In a preferred embodiment of the invention the member is provided in the form of a ring which may be manufactured from plastics material. In a further, especially preferred, embodiment the said ring may initially be applied to the neck as part of a closure for the container, which may be of the type known as a "tamper-evident" closure.

It is a feature of certain such tamper-evident closures that they comprise a cap portion comprising a top and depending skirt and a ring portion which depends from the lower edge of the skirt of the cap by frangible connecting pieces such that when the closure is first applied to the neck the cap and ring portions are secured in position for example by interengaging threaded portions on the cap portion and the neck but upon removal of the cap the frangible connecting pieces between the cap and ring portions break leaving the rings in place. The cap and ring portions are normally moulded in one piece from plastics material.

Examples of this type of tamper-evident closure are given for example in published European Patent Application No 80846 which are of the form described above and additionally are provided with internal projecting means on the ring adapted to position and engage below external projecting means on the neck to resist upward movement of the ring when the cap is unscrewed, and advantageously are also provided with ratchet teeth on the lower edge of the skirt of the cap adapted to engage with cooperating ratchet teeth on the top edge of the ring in such a way that when the closure is screwed onto the neck the ratchet teeth engage and the ring turns with the cap but when the closure is unscrewed the teeth on the cap move out of engagement with the teeth on the ring thus facilitating breaking of the frangible connecting pieces.

A further advantage can be gained by providing the ring with formations adapted to engage with discontinuous ratchet shaped outer beads on the neck such that the formations on the ring ride over the ratchets on the neck when the cap is screwed on and engage so as to prevent rotation of the ring when the cap is unscrewed. The formations may be discontinuous ratchet shaped inner beads as shown in published European Patent Application No. 133348.

A still further advantage can be gained by providing the upper surface of the ring with ratchet shaped formations adapted to engage with corresponding ratchet shaped formations on the lower surface of a formation on the neck defining the first position for the ring.

In a preferred embodiment of the present invention the ring portion can thus serve the dual purpose of providing part of a tamper evident closure for a container and being the moveable member described above.

The means for supporting the container may be provided in the form of one or more arms depending from the dispenser having formations adapted to engage with the member in its first position thus being able to provide support for the container, and adapted to permit disengagement of the container therefrom when the member is in its second position. For example, the arm or arms may be adapted to release the container upon operation of a lever, button or switch, or (in a preferred embodiment) upon rotation of the container, conveniently a bottle, in one or either direction. In this embodiment the bottle for example may be provided with formations adapted to force apart the arms and thus release the bottle upon rotation thereof. Such formations may be provided on the neck or on the bottle itself.

The dispenser may be any means for discharging the contents of the container, for example a pump, spray jet or nozzle, tap or measured quantity dispenser (eg as used for dispensing alcoholic liquors).

A particular field in which the invention is useful is in the dispensing of surgical and general purpose hospital hand cleansing formulations which normally contain antiseptics. Particular antiseptics used for this purpose are the chlorhexidine salts (eg chlorhexidine gluconate) sold by Imperial Chemical Industries PLC under the trade mark "Hibitane".

Formulations containing chlorhexidine salts together with surfactants and other ingredients are for example described in British Patent No. 1338003 and are sold by Imperial Chemical Industries PLC and its associated companies under the trade marks "Hibiscrub" and "Hibiclens". Such formulations may be provided in containers in accordance with the invention which may be used in assembly with known dispensers provided with support means in accordance with the invention.

Furthermore, formulations containing chlorhexidine salts, aromatic alcohols and low levels (less than 10% by weight) of surfactants such as are described in our copending British Patent Application No 8607686 may be dispensed from containers in accordance with the invention which may advantageously be used in assembly with foam generating dispensers provided with support means in accordance with the invention. Suitable foam generating dispensers are described for example in published European Patent Application Nos. 19582 and 79853.

The invention may also be useful for providing a connection between inlet and outlet portions on any pair of components which require a non-reusable connection between them. The invention is primarily of use in the field of disposable equipment, in particular disposable hospital equipment, where it is desired that the equipment is only used once. For example the invention could provide a connection between tubes used for liquid transport. A particular use for the invention in this aspect would be for example in the connection of an outlet from a catheter to the inlet of a tube leading to a drainage bag, where it is desired to ensure that the drainage bag could not be reused or accidentally reconnected. A further application of the invention is in the field of non-reusable containers for fluids, such as for example, milk, paint, freeze-dried antibiotics and the like. Other applications for the invention will be evident to the reader of the specification and are included within the scope of the invention accordingly.

One embodiment of the invention will now be illustrated by way of Example (without limiting the scope of the invention as described) by reference to the accompanying figures in which FIGS. 1 and 2 show a bottle in accordance with the invention in two stages of attachment to a connecting means in accordance with the invention;

FIG. 3 shows a bottle in accordance with the invention in the act of being released from the said connecting means;

FIG. 4 shows a bottle in accordance with the invention when disengaged from the said connecting means;

Referring to the figures (in which the numerals bear the same meanings in each figure unless otherwise indicated) the bottle indicated generally by (1) (which may be of any shape but is illustrated herein as having a squarish cross-section) is provided with a neck (2) with a threaded portion (3). Below the threaded portion are moulded formations (4) and (5) seen most clearly in FIG. 4.

Figure 1:
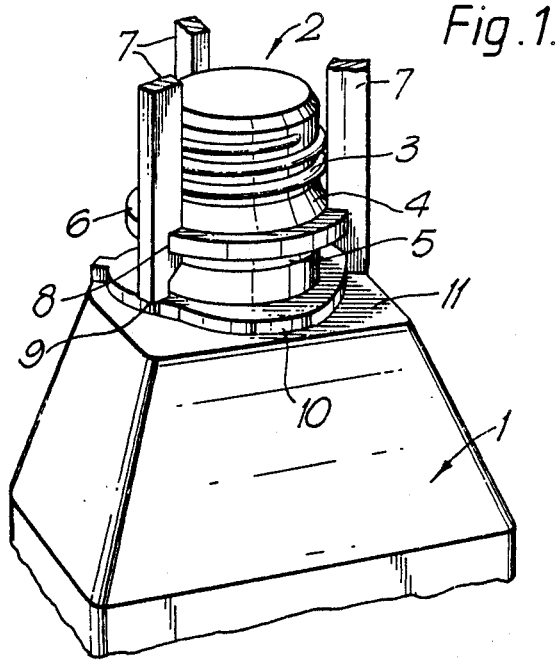

A ring (6) is disposed about the neck portion in such a way that in FIG. 1 it rests upon the upper surface of the moulded portion (5) (which is slightly concave in section) and abuts the lower (flat) surface of the moulded portion (4).

The ring (6) is thus prevented from moving upward in relation to the neck as drawn but can move downward upon the application of sufficient force, the ring being desirably made in such a way that it deforms sufficiently to allow it to move down past the upper surface of the moulded portion (5), but resists upward movement past the moulded portion (4). For example the ring may be provided with internal projecting means adapted to position and engage below the flat lower surface of the moulded portion (4), as generally described in European Patent Application 80846.

Three arms (7) extend downward from the dispenser (not shown) and are provided with indentations (8) which correspond in dimension with the depth of the ring (6) such that the arms in FIG. 1 grip the ring. The bottle (1) is thus supported by the arms via the ring as it abuts the lower surface of the moulded portion (4). In this position the lower extremities (9) of the arms (7) do not come into contact with the cam surfaces (10) which are provided on the bottle about the lower part of the neck and thus rotation of the bottle simply causes the ring to rotate in relation to the arms (7) without releasing the bottle.

Upward force applied to the bottle is transmitted to the upper surface of the ring (6) by the upper part of the indentations (8) and upon application of sufficient force the ring (6) will slide over the upper surface of the moulded portion (5) until the lower extremities (9) of the arms (7) come into close proximity with the top surface (11) of the bottle.

Figure 2:
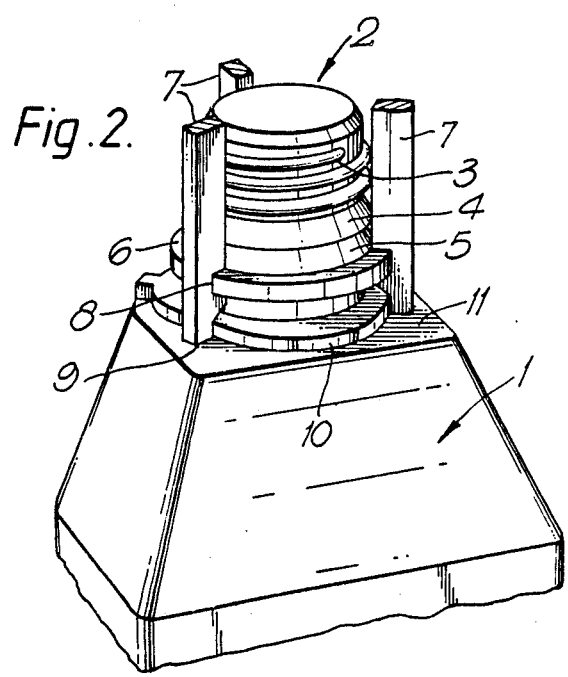

In this position (shown in FIG. 2) rotation of the bottle causes the arms (7) to be forced apart by the cams (10) thus moving the indentations (8) out of engagement with the ring and permitting the bottle to be removed (this process is shown in FIG. 3).

Figure 5:
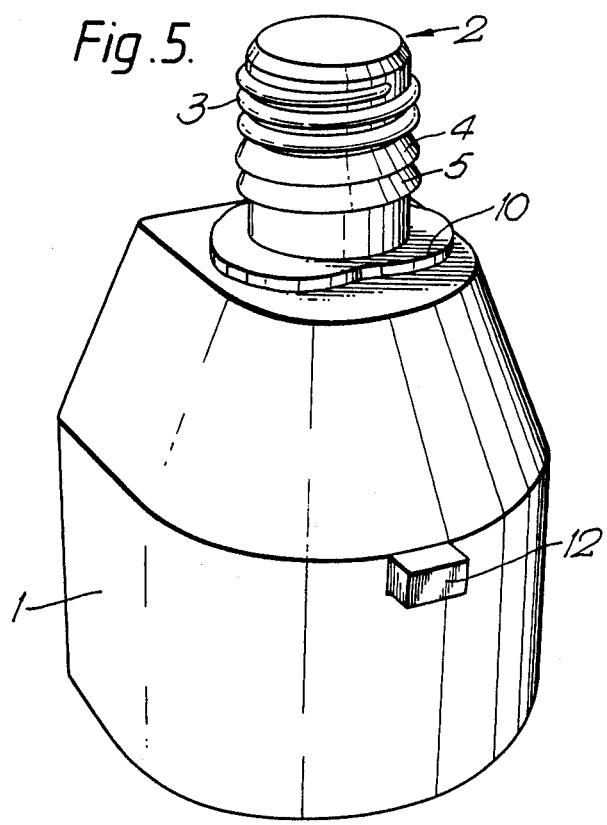
FIG. 5 shows a bottle according to a further embodiment of the invention.
Figure 6:
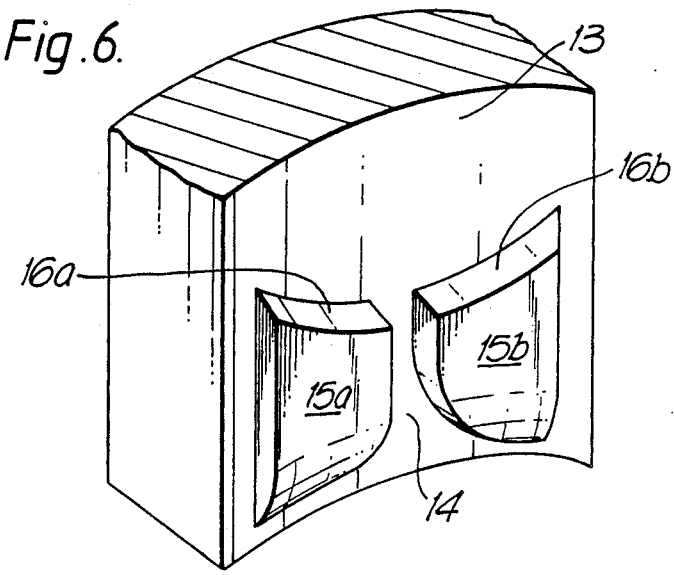
FIG. 6 shows part of the support means for cooperating with the bottle of FIG. 5.

In another embodiment of this invention, shown in FIGS. 5 and 6, the bottle (1) is provided with a projecting lug (12) and the dispenser (not shown) has a back-plate (13) provided with guiding means for said lug (12). Thus, FIG. 5 shows a bottle (1) having a projecting lug (12) and FIG. 6 shows a back-plate (13) having a channel (14) formed between two raised portions (15a, 15b) in which channel the lug (12) is slideably movable. In use the bottle (1) is placed against the back-plate (13) with the lug (12) at the lower end of channel (14). Upward movement of the bottle (1) urges the lug (12) up the channel (14) to the top of said channel. In this position bottle (1) is held by dependent arms of the dispenser, as described with regard to FIGS. 1 and 2. For removal of the bottle (1) from the dispenser, the bottle (1) is rotated in either direction so that the lug (12) is urged upwards by interaction with the guiding cam surfaces (16a, 16b). In this way the bottle (1) is urged upwards and the necessary force is provided to move ring (12) over the moulded portion (5) as hereinbefore described. The movement of the ring (12) can be concurrent with the opening of the arms of the dispenser.

Upon removal of the bottle the ring (6) falls from its previous position abutting the lower edge of the moulded portion (5) into the position shown in FIG. 4, in which the ring lies against the cam surfaces (10) on the top part of the bottle.

If it is attempted to reconnect the bottle to the dispenser it will be found that the ring in this position cannot be made to engage with the indentations (8) and thus the bottle cannot now be supported by the arms (7). The ring is advantageously made of a material, and with a configuration, making it difficult or impossible to return the ring from the position shown in FIG. 4 to that shown in FIG. 1 without breaking it. This purpose may for example be accomplished by making the ring in accordance with European Patent Applications 80846 and 133348, as discussed above.

Further, the ring may advantageously be applied to the bottle initially as part of a tamper resistant closure which is screwed onto the bottle neck in such a manner that the ring portion thereof slides over the upper surface of the moulded portion (4) into the position shown in FIG. 1 and is left in that position upon removal of the cap portion of the said closure. Application of the bottle to the dispenser will then result in the ring being in the position shown in FIG. 1 in relation to the arms (7). Such a tamper resistant closure may be advantageously as described in European Patent Application 80846 and 133348, and/or the upper surface of the ring 6 may be provided with ratchet shaped formations adapted to engage with corresponding ratchet shaped formations on the lower surface of the moulded portion (4).

We claim:

1. A first fluid-handling device having a fluid outlet portion; a second fluid-handling device having a fluid inlet portion, wherein said first fluid-handling device is a container and the second fluid-handling device is a dispenser; means for coupling said fluid outlet portion to said fluid inlet portion including support means extending from one of said fluid handling devices towards the other; a member directly mounted to said fluid outlet portion and movable axially relative thereto between a first position and a second position so that in the first position said movable member and said support means are engaged and said fluid outlet portion is coupled to said fluid inlet portion and in the second position the movable member and the support means can be disengaged so that the said fluid outlet portion and said fluid inlet portion can be disconnected; and means for preventing axial movement of said movable member from said second position to said first position;

the support means comprising arms depending from the dispenser having formations adapted to engage with the member in the first position, and adapted to permit disengagement of the container therefrom when the number is in the second position.

2. The combination of claim 1 which is at least in part manufactured from plastics material.

3. The combination of claim 1 wherein the container includes a dispensable fluid.

4. A first fluid-handling device having a fluid outlet portion; a second fluid-handling device having a fluid inlet portion, wherein said first fluid-handling device is a container and the second fluid-handling device is a dispenser; means for coupling said fluid outlet portion to said fluid inlet portion including support means extending from one of said fluid handling devices towards the other; a member directly mounted to said fluid outlet portion and movable axially relative thereto between a first position and a second position so that in the first position said movable member and said support means are engaged and said fluid outlet portion is coupled to said fluid inlet portion and in the second position the movable member and the support means can be disengaged so that the said fluid outlet portion and said fluid inlet portion can be disconnected; and means for preventing axial movement of said movable member from said second position to said first position;

the fluid outlet portion comprising a neck of substantially circular cross section and the member comprises a collar slideably movable on the neck between the first and second positions which positions are defined by formations on the neck.

5. The combination of claim 4 which is at least in part manufactured from plastics material.

6. The combination of claim 4 wherein the container includes a dispensable fluid.

7. A first fluid-handling device having a fluid outlet portion; a second fluid-handling device having a fluid inlet portion, wherein said first fluid-handling device is a container and the second fluid-handling device is a dispenser; means for coupling said fluid outlet portion to said fluid inlet portion including support means extending from one of said fluid handling devices towards the other; a member directly mounted to said fluid outlet portion and movable axially relative thereto between a first position and a second position so that in the first position said movable member and said support means are engaged and said fluid outlet portion is coupled to said fluid inlet portion and in the second position the movable member and the support means can be disengaged so that the said fluid outlet portion and said fluid inlet portion can be disconnected; and means for preventing axial movement of said movable member from said second position to said first position;

the outer surface of the container being provided with a plurality of cam formations such that upon rotation of the container cooperation of the cam formations and supporting means disengages the container from said supporting means.

8. The combination of claim 7 which is at least in part manufactured from plastics material.

9. The combination of claim 7 wherein the container includes a dispensable fluid.

10. A first fluid-handling device having a fluid outlet portion a second fluid-handling device having a fluid inlet portion wherein said first fluid-handling device is a container and the second fluid-handling device is a dispenser; means for coupling said fluid outlet portion to said fluid inlet portion including support means extending from one of said fluid handling devices towards the other; a member directly mounted to said fluid outlet portion and movable axially relative thereto between a first position and a second position so that in the first position said movable member and said support means are engaged and said fluid outlet portion is coupled to said fluid inlet portion and in the second position the movable member and the support means can be disengaged so that the said fluid outlet portion and said fluid inlet portion can be disconnected; and means for preventing axial movement of said movable member from said second position to said first position;

the container having a projecting lug and the dispenser being provided with guiding means the arrangement being such that on rotation of the container, cooperation of the lug and guiding means moves the member into the second position.

11. The combination of claim 10 which is at least in part manufactured from plastics material.

12. The combination of claim 10 wherein the container includes a dispensable fluid.

* * * * *